March 24, 1970      P. A. G. LEPELLETIER      3,502,181
DUAL CIRCUIT, SELF-ENERGIZING DISC BRAKE
Filed Jan. 8, 1968      5 Sheets-Sheet 1
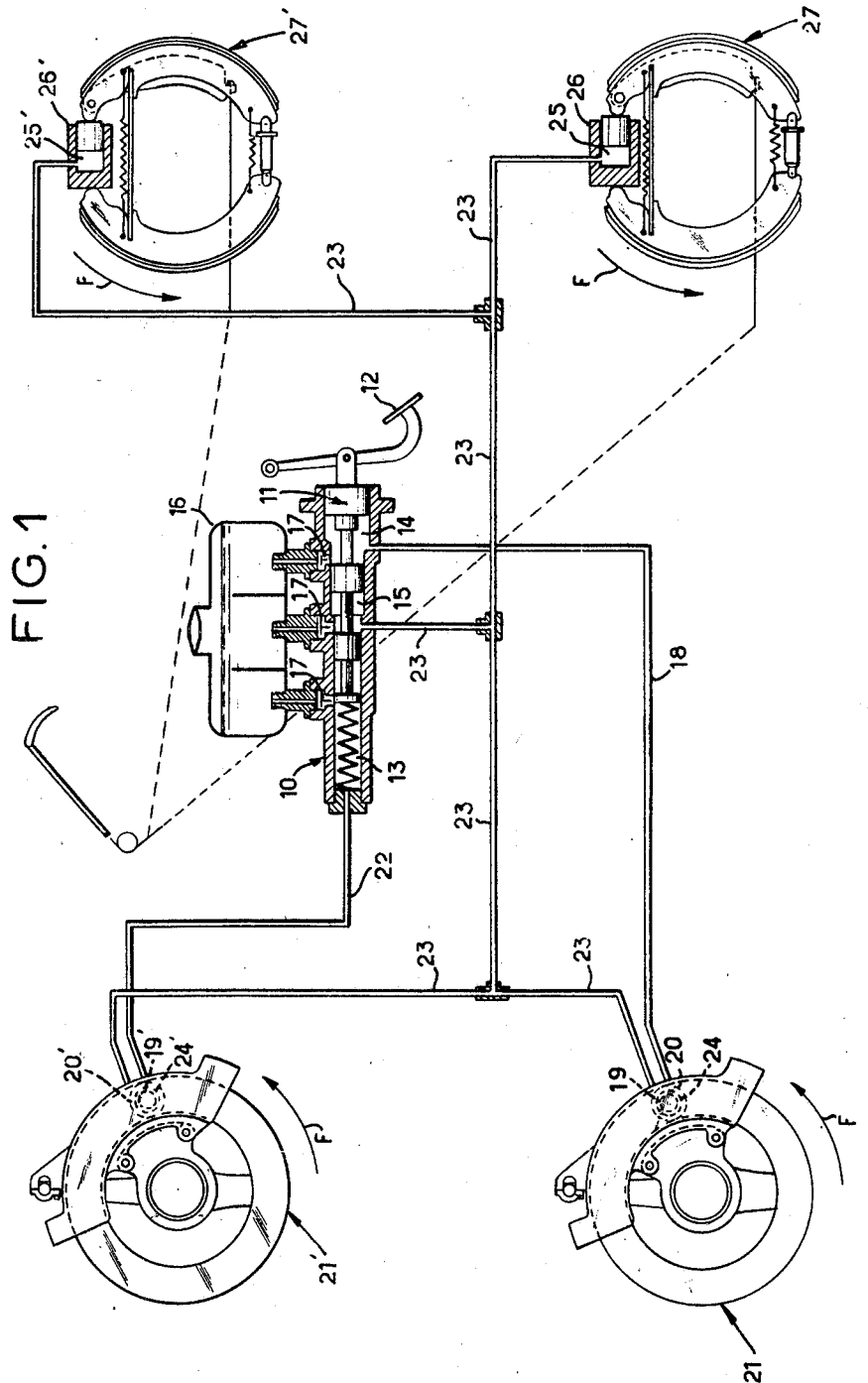
INVENTOR
PIERRE ANDRE GEORGES LEPELLETIER
BY Young & Thompson
ATTYS.

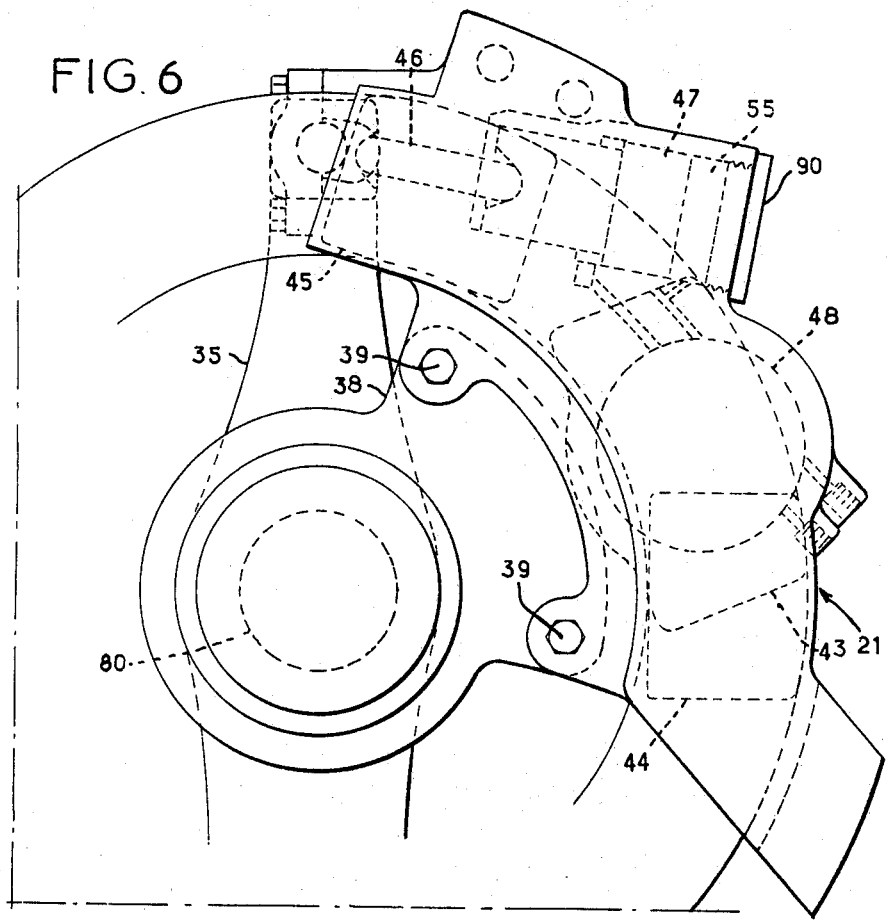
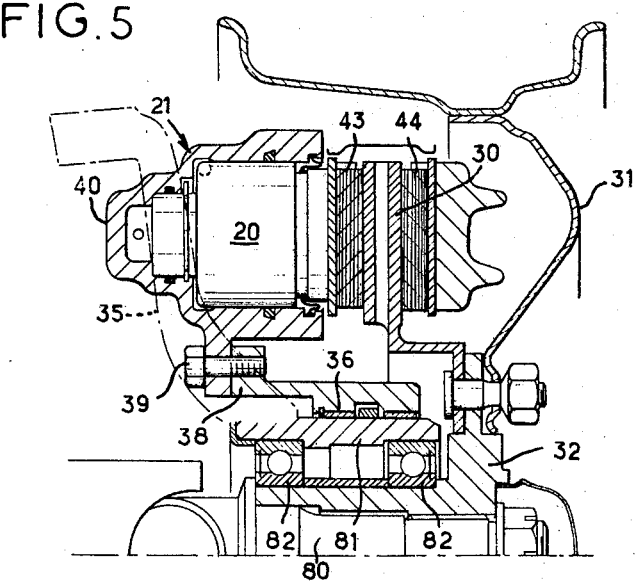

March 24, 1970  P. A. G. LEPELLETIER  3,502,181
DUAL CIRCUIT, SELF-ENERGIZING DISC BRAKE
Filed Jan. 8, 1968  5 Sheets-Sheet 5

INVENTOR
PIERRE ANDRE GEORGES LEPELLETIER
By Young + Thompson
ATTYS

United States Patent Office 3,502,181
Patented Mar. 24, 1970

3,502,181
DUAL CIRCUIT, SELF-ENERGIZING DISC BRAKE
Pierre Andre Georges Lepelletier, Chatou, France, assignor to Societe Anonyme Francaise du Ferodo, Paris, France, a company of France
Filed Jan. 8, 1968, Ser. No. 696,438
Claims priority, application France, Jan. 16, 1967, 91,191
Int. Cl. B60t *11/10;* F01b *31/00*
U.S. Cl. 188—152          2 Claims

ABSTRACT OF THE DISCLOSURE

A double-circuit disc brake comprises a rotating disc, a stirrup member rotatably-mounted on at least one bearing coaxial with the axis of the disc and adapted to move parallel to said axis on said bearing, and a piston slidably-mounted in the stirrup parallel to the axis of the disc and acting through the intermediary of a first lining means on the disc. A second lining means is interposed between the disc and the side of the stirrup opposite to said piston, and at least one fluid cushion is interposed between a fixed point and the stirrup which receives the circumferential force developed by friction during braking. This fixed point and/or the fluid cushion are located on one of the sides of the disc at some distance from this latter, the centre of thrust of the second lining means being circumferentially displaced with respect to the centre of thrust of the first lining means.

---

The present invention relates to disc brakes, especially of the double-circuit type, and more particularly but not exclusively to disc brakes of this kind forming part of the braking system of an automobile vehicle, in which the disc brakes are supplied, at least in part, by distribution of a working fluid to the actuating sylinders or jacks of the wheel-brakes of the same axle, in equal or proportional volumes, means being provided for controlling the compensation or balancing of the braking reactions.

One of the objects of the invention is a double-circuit disc brake which is simple, effective and easy to manufacture, and which fulfils the conditions of safety desirable in the event of circuit failures, especially with vehicles which are heavy at the front and light at the rear.

According to one of the aspects of the invention, a double-circuit disc brake comprises a rotating disc, a stirrup member rotatably mounted on at least one bearing coaxial with the axis of the disc and capable of moving parallel to the said axis on the said bearing, the stirrup having a small angular amplitude, for example an amplitude of the order of one quadrant, a piston slidably-mounted in the stirrup parallel to the axis of the disc and acting through the intermediary of a first lining mean on the disc, a second lining means being interposed between the disc and the side of the stirrup opposite to the said piston, at least one fluid cushion being housed in the said stirrup and being interposed between a fixed point and the stirrup, which receives the circumferential force developed at the moment of braking.

By virtue of this arrangement, the stirrup member of compact form is positively guided by the bearing both in rotation and in translation parallel to the axis of the disc, which permits the forces developed during the course of braking to be effectively absorbed. The resultant effort acting on the bearing is less than the sum of the forces of action and reaction, by reason of the concentration of the mounting in a sector of reduced amplitude, and in consequence permits a construction which is well suited for automobile applications: disc brake arranged either inside a wheel or alongside a wheel, or at the output of the gear-box, or in any other appropriate position.

The fixed reaction point may be provided in the plane of the disc, but in general, for reasons of diametral size, it is preferable to locate it on one of the two sides of the disc, at some distance from this latter.

This may result in an undesirable torque on the stirrup, and in order to remedy this, according to another aspect of the invention, a double-circuit disc brake is characterized in that it comprises a rotating disc, a stirrup member rotatably mounted on at least one bearing coaxial with the axis of the disc and capable of moving parallel to the said axis on the said bearing, a piston slidably-mounted in the stirrup parallel to the axis of the disc and acting through the intermediary of a first lining means on the disc, a second lining means being interposed between the disc and the side of the stirrup opposite to the said piston, at least one fluid cushion being interposed between a fixed point and the stirrup which receives the circumferential force developed by friction at the moment of braking, the said fixed point and/or the said fluid cushion being located on one of the sides of the disc at some distance from this latter, the centre of thrust of the said second lining means being provided circumferentially displaced with respect to the ecntre of thrust of the said first lining means.

When the reaction is absorbed on the side of the stirrup which receives the brake-actuating piston, the above-mentioned displacement of the lining means is orientated in the direction of forward running.

The displacement of the lining means on each side of the disc has the result of making the wear of the linings uniform. As the reaction on the stub axle resulting from the braking force is applied at a certain distance from the plane of the disc, whereas the braking reaction is in the plane of the disc, the result is a torque on the stirrup which is balanced wholly or partly by the displacement of the two lining means. A balance is advantageously obtained for the mean value of utilization of the coefficient of friction, for example 0.35.

The two aspects of the invention referred to above are preferably combined, and a double-supply disc brake according to the invention is more particularly characterized in that it comprises a rotating disc, a stirrup member rotatably mounted on at least one bearing coaxial with the axis of the disc and capable of moving parallel to the said axis on the said bearing, the stirrup having a small angular amplitude, for example an amplitude less than one quadrant, a piston slidably mounted in the stirrup parallel to the axis of the disc and acting through the intermediary of a first lining means on the disc, a second lining means which is interposed between the disc and the side of the stirrup opposite to the said piston, and the centre of thrust of which is displaced with respect to that of the first lining means in the direction of rotation of the disc during forward running, at least one fluid cushion housed in the stirrup on the side of the said piston at some distance from the plane of the disc, the said fluid cushion being interposed between a fixed point and the stirrup which receives the circumferential force developed by friction at the moment of braking.

In one form of embodiment, the first lining means is centered in the vicinity of the axis of the piston, while the second lining means comprises two linings spaced apart, of which the centre of thrust is displaced with respect to the axis of the piston.

According to one arrangement of the invention which can be utilized independently or in combination with the other arragements, the piston is hollow in the form of a socket and is engaged in a bore of the stirrup, while a sleeve axially coupled to the stirrup is engaged both in the piston and in the said bore, a so-called primary hydraulic chamber having an annular working section comprised between the bore and the external section of the sleeve, while another so-called secondary hydraulic chamber has a full working section defined by the external section of the sleeve.

Another piston substantially parallel to the plane of the disc has two bearing surfaces which define two chambers coupled respectively to the said primary chamber and to the said secondary chamber, this other piston being joined by a crank-arm to a fixed point.

More particularly, this fixed point is formed by the stub-axle of the wheel and comprises a spindle which is engaged in an elongated slot of the stirrup and which preferably is of frustoconical shape. During the course of braking on reverse running, this frustoconical shape makes it possible to ensure a better support of the linings on the disc. In addition, the frustoconical shape of the spindle tends to give a better distribution of the working clearance between the linings and the disc.

According to a further characteristic feature, the mounting of the stirrup on the bearing comprises an axial positioning means forming a device for taking-up wear.

The wheel which receives the brake may be driving or non-driving; in the first case the stub-axle is hollow and in the second case the stub-axle is solid.

The part of the stirrup which receives the piston may be provided either in two or more parts or in a single part. The axes of the pistons being then suitably directed so as to take account of the necessities of assembly and dismantling.

The stub-axle bearing which receives the stirrup can be in one or more parts having different diameters and/or different lengths of bearing surfaces.

The objects, characteristic features and advantages of the invention will furthermore be brought out in the description which follows below of forms of embodiment chosen by way of examples, reference being made to the accompanying drawings, in which:

FIG. 1 is a general diagrammatic view of a braking installation according to the invention;

Figure 7:
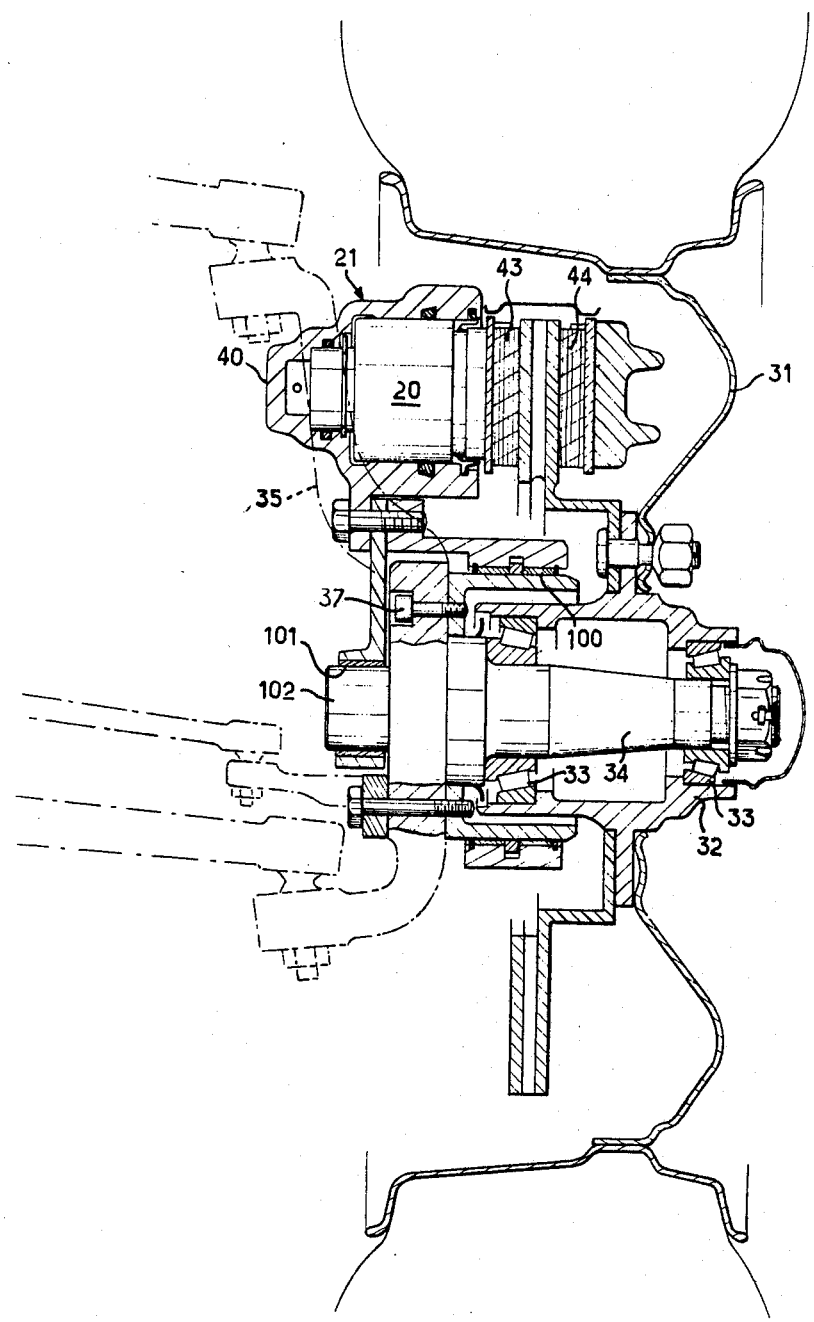

FIGS. 5, 6 and 7 relate respectively to three alternative forms of the brake.

In the form of construction shown in FIGS. 1 to 4, which concerns by way of example a braking installation of an automobile vehicle, there can be seen from FIG. 1 a master-cylinder at 10, this master-cylinder comprising three stepped bores receiving a master-piston 11 actuated by a brake pedal 12. The master-piston 11 defines with the three bores, three chambers 13, 14, 15, associated with a tank 16 through the intermediary of valves 17 which are partly open at rest and are closed as soon as the pedal 12 is depressed.

One of the chambers 13–15 (FIGS. 1 and 3) is coupled by a conduit 18 to the chamber 19, known as the primary chamber, of a wheel-cylinder 20 of the left-hand front brake 21. Another of the chambers 13–15 is coupled by a conduit 22 to the chamber 19′, known as the primary chamber, of a wheel-cylinder 20′ of the right-hand front brake 21′. The third of the chambers 13–15, which, in the example shown, is the chamber 15 located between the chambers 13 and 14, is connected by a conduit 23 on the one hand to the so-called secondary chamber 24 of the wheel-cylinder 20 of the left-hand front brake 21, and on the other hand to the so-called secondary chamber 24′ of the wheel-cylinder 20′ of the right-hand front brake 21′.

The conduit 23 is also connected to the chamber 25 and 25′ of the single-circuit wheel-cylinders 26 and 26′ of the left-hand rear-brake 27 and the right-hand rear-brake 27′.

These rear brakes 27 and 27′ (see FIG. 1) are of the type with jaws arranged inside a drum and working as self-releasing devices during the course of braking on forward running (arrow F) and as self-applying devices during the course of braking on reverse running.

The front brakes will now be described in more detail, for example the left-hand brake (see FIGS. 1 to 4).

The front brake 21 comprises a disc 30 which is rigidly fixed to the web 31 of the wheel, the assembly being mounted on a hub 32 which is supported by bearings 33 on the stub axle 34 of the wheel. In the example shown in FIGS. 2 to 4, the front wheels are not driving wheels, but the invention is equally applicable to the case where the front wheels are driving wheels, as will be described later with reference to FIG. 5.

The stub-axle 34 is rigidly fixed to an oblong vertical member 35 which forms a means of support for the shaft of the steering pivots of the front wheel.

A central bearing 36, coaxial with the stub-axle 34, is fixed on this stub-axle at 37 and is intended to receive a support 38 to which a stirrup member 40, 40′ is fixed in turn by means of screws 39. The support 38 can rotate round the bearing 36 and it can also slide axially with respect to the said bearing.

A keeper ring 36a, engaged with a clearance in a groove of the support 38, is engaged round the bearing 36 and defines the possible axial travel of the support 38 with respect to the bearing. It is only permitted to slide itself with respect to the bearing 36 when the stirrup 40, 40′ travels under the action of the gripping forces of the disc, in proportion to the wear of the linings 44 and 45. The keeper-ring 36a thus maintains a constant clearance irrespective of the wear and constitutes a device for taking-up the wear of the linings 44 and 45.

The stirrup is mounted astride the disc 30 and is in two main parts 40 and 40′ fixed to each other by screws 41. The stirrup 40, 40′ has the shape of a sector of small angular amplitude, for example an amplitude less than a quadrant.

The gripping of the disc 30 is effected by a piston 42, the axis of which is parallel to the axis of the disc 30. The piston 42 is slidably mounted in the stirrup 40 and applies against the disc 30, on the one hand directly, an internal lining 43 and on the other hand, through the intermediary of the stirrup 40, two spaced external linings 44 and 45. The lining 43 constitutes a first lining means centered on or in the vicinity of the axis of the piston 42, while the linings 44 and 45 constitute a second lining means, the centre of thrust of which is displaced with respect to that of the first lining means 43 in the direction F of rotation of the disc 30 on forward running. The braking reaction is absorbed by the stub-axle 34, 35 and is transmitted thereto during forward running by a crank-arm 46 associated with a piston 47, the axis of which is substantially parallel to the disc 30.

The piston 42 is hollow in the form of a socket. It is engaged in a bore 48 in the stirrup 40 which is parallel to the axis of the disc 30. A sleeve 49, axially coupled by a circlip 49a to the stirrup 40 is engaged both in the piston 42 and in the bore 48. The primary chamber 19 has an annular working section comprised between the bore 48 and the external section of the sleeve 49, while the secondary chamber 24 has a full working section defined by the external section of the sleeve 49.

The piston 47 is provided with two bearing surfaces 50 and 51 having different diameters and respectively engaged in two bores 52 and 53, so as to define two chambers 54 and 55 separated by the large bearing surface 51 of the piston 47. The chamber 54 which has a differential annular section and which is located on the side of the crank-arm 46 is coupled by a conduit 56 to the primary chamber 19. The chamber 55 which has a full section and which is located opposite to the crank-arm 46, is connected by a conduit 57 to the secondary chamber 24. A spring 58 tends to apply the piston 47 against the crank-arm 46 which is in turn applied against the stub-axle 34, 35. The chamber 55 forms a liquid cushion interposed between the fixed point 35 and the stirrup 40 which receives the circumferential force developed in the direction of the arrow F by the friction at the moment of braking during forward running. The chamber 54 transmits to the chamber 19 the effect of the displacements of the piston 47 with respect to the stirrup 40.

It will be noted that the chambers 19 and 54 in which the primary pressure exists, generally surround the chambers 24 and 55 which are subjected to the secondary pressure, which reduces the forces applied to the joints. A joint is however provided at 59 at the junction of the parts 60 and 61 which constitute the half-stirrup 40 located on the outside of the wheel.

The brake is actuated simultaneously by the primary pressure at 19 (equal or proportional volumes are delivered from the chambers 13 and 14 by the conduits 18 and 22 to the two brakes 21 and 21') and by the secondary pressure at 24, this pressure being balanced by the intercommunication due to the conduit 23 on the two brakes 21 and 21'. There is thus obtained a certain amount of hydraulic self-application at the level of the wheel-cylinder while the secondary chamber 15 of the master-cylinder, arranged to be reduced in volume during the course of braking, provides a self-releasing effect, which makes it possible to obtain overall, an appropriate condition of operation of the entire system.

As has already been indicated above, the lining 43 located on the side of the piston 42 is provided so as to be substantially symmetrical with respect to the axis of the piston 42, whereas the linings 44 and 45, located on the side opposite to the piston 42, are displaced with respect to the axis of the said piston. The displacement of the whole of the linings 44 and 45 with respect to the axis of the piston 42 is orientated in the direction F of forward running. Instead of the two linings 44 and 45, only one displaced lining could be provided.

The reaction on the stub-axle 34, 35 resulting from the braking effort is applied at a certain distance from the disc 30, whereas the tangential braking reaction is in the plane of the disc. This results in a couple on the stirrup 40, 40' which is precisely balanced by the displacement of the linings 43 and 44, 45 on each side of the disc 30. This equilibrium is desired for a coefficient of friction of utilization considered as an average, for example of the order of 0.35.

If the coeffcent of friction is different from 0.35, a certain unbalance results which is absorbed by means of a modification, in part of the distribution of the pressure on the linings and in part of the reactions developed on the bearings 36.

The disc 30 receives a tangential force which becomes compounded with the braking force at the ground and with the dynamic load on the wheel so as to give a resultant load on the bearings 33. In addition, the disc 30 is subjected to a torsion force which is also transferred to the bearings 33 and which is of a similar nature to that of the forces to which these bearings 33 are subjected during turns made by the vehicle.

On forward running, the crank-arm 46 transmitting the braking reaction force is engaged in a recess 62 of the stub-axle 34, 35. During reverse running, the reaction is absorbed by means of an appropriate device which comprises a spindle 63 engaged in an elongated slot 64 of the stirrup 40. When there is no braking action, the spring 58 brings back the stirrup 40 into abutment by the side 65 of the slot 64 on the spindle 63. The abutment at 65 corresponds to the position of rest and to the position of operation of the brake for reverse running. During the course of braking on forward running, the spindle 63 is located in the slot 64 in a position intermediate between the side 65 and the opposite side 66. There is an abutment against the side 66 in the event of a failure of the secondary circuit, that is to say if the pressure at 24, 57 and 55 falls to zero.

The spindle 63 may be cylindrical but is advantageously made frustoconical.

Whereas in forward running, the linings 44 and 45 work in identically the same manner, in reverse running it is the lining 43 and the lining 44 which mainly work, while the lining 45 works to a lesser extent.

With a frustoconical spindle 63, the lining 45 can be caused to work more in reverse running while a better distribution of the working clearance can also be obtained at rest.

The angle at the apex of the truncated cone of the spindle 63 is preferably made small in order that the axial movement of the stirrup due to wear of the linings does not substantially modify the conditions of working at 63, 64.

By virtue of the arrangement according to the invention, the total load on the central bearing 36, which depends on the angle between the general direction of the friction forces and the line of reaction, is relatively small with respect to these forces.

The available space which is reserved in the sleeve 49 enables if necessary a device to be housed in this space for taking-up play proper to the piston 42 and to the lining 43, in combination with the device 36a on the bearing 36 intended for taking-up the clearance proper to the linings 44 and 45.

The various joints co-operating with the bore 48, the piston 42 and the sleeve 49 may furthermore constitute in themselves a device for taking-up wear of the lining 43.

There will be noted the construction in two parts 60 and 61 of the half-stirrup 40 on the outside of the wheel. These parts are fixed together along a flat joint 70 perpendicular to the plane of the disc. A centering device 71 permits the parts 60 and 61 to be positioned with respect to each other and enables the conduit 57 to be arranged solely in the part 61. With regard to the conduit 56, this comprises one part in the piece 60 and one part in the piece 61 with the interposition of the joint 72.

As and when the linings 43, 44, 45 become worn, the stirrup 40, 40' moves parallel to the axis of the disc 30 on the central bearing 36, the ring 36a permitting this dsplacement while maintaining the axial stability of the stirrup.

During the course of braking on forward running (direction of the arrows F), equal or proportional volumes of oil are expelled from the master-cylinder 10 through the conduits 18 and 22 into the primary chambers 19 and 19' of the front brakes 21 and 21', and cause an outward movement of the pistons 42 which grips the disc 30 between the linings 43 and 44, 45. The disc 30, rotating in the direction of the arrow F, drives the stirrup 40, 40' which, by the action of the crank-arms 46 causes the pressure to rise in the chambers 55, and consequently in the chambers 24 and 24'. The secondary pressures at 24 and 24' are kept equal by the intercommunication due to the conduit 23, which ensures an excellent balance of the braking, while this same secondary pressure 24 contributes, by direct action on the piston 42, in increasing the grip of the disc 30.

The secondary pressure is high and ensures, in addition to a well-balanced braking by the front brakes 21, 21', an also well-balanced braking by the rear brakes 27, 27' which work with a self-releasing action.

In case of braking during reverse running (direction opposite to that of the arrow F) the reactions are reversed. The spindle 63 remains applied against the side 65 of the elongated slot 66, the stirrup 40 thus remaining angularly stationary.

The secondary pressure becomes lower than on forward running, but its effect on the rear brakes 27 and 27' is increased since these latter work with a self-applying action and not by a self-releasing action.

If during the course of braking on forward running the secondary circuit 23 became deflective, the stirrup 40, 40' would be displaced until the spindle 63 had come into contact with the side 66 of the slot 64. The rear brakes would no longer act but the braking power of the front axle would be substantially maintained, thus ensuring a good margin of safety.

In the event of failure of a primary circuit 18 or 22, for example the circuit 18, everything takes place normally in the two rear brakes and in the front brake associated with the circuit 22. The defective front brake, that is to say the front brake associated with the circuit 18 retains 60 to 70% of its normal power, so that the total braking power of the vehicle is practically safeguarded.

Reference will now be made to FIG. 5, in which the arrangement is similar to that which has just been described with reference to FIGS. 1 to 4, but in which the front wheels are driving wheels. In this case, the stub-axle comprises a hollow cylindrical portion 81 carrying, by means of bearings 82, the hub 32, which is in turn fixed on the end-piece 80 of the half transmission-shaft. The bearing 36 on which the stirrup-carrier guide 38 is mounted, is arranged, preferably by means of machining, on the external cylindrical bearing surface of the part 81. The operation is similar to that which has been previously described.

In another alternative form shown in FIG. 6, the arrangement is again similar to that which has been described with reference to FIGS. 1 to 4, but the portion of the stirrup 40 which is located on the side outside the wheel is made in a single piece, instead of comprising the two parts 60 and 61 assembled together. In this case, the axis of the piston 47 is suitably inclined in order to permit a direct mounting of the various parts of the assembly, including a plug 90 intended to close the chamber 55.

Figure 3:
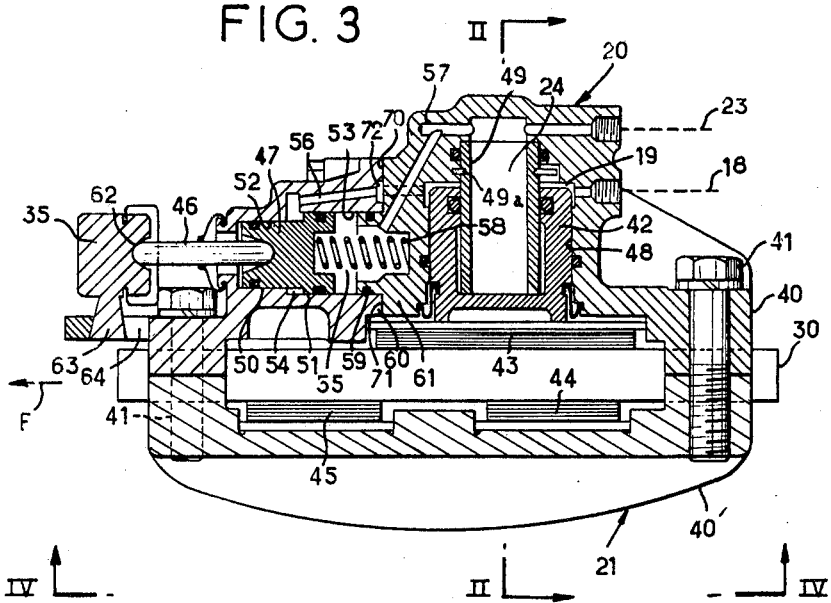
FIG. 3 is a view of the brake in cross-section taken along the line III—III of FIG. 4.
Figure 2:
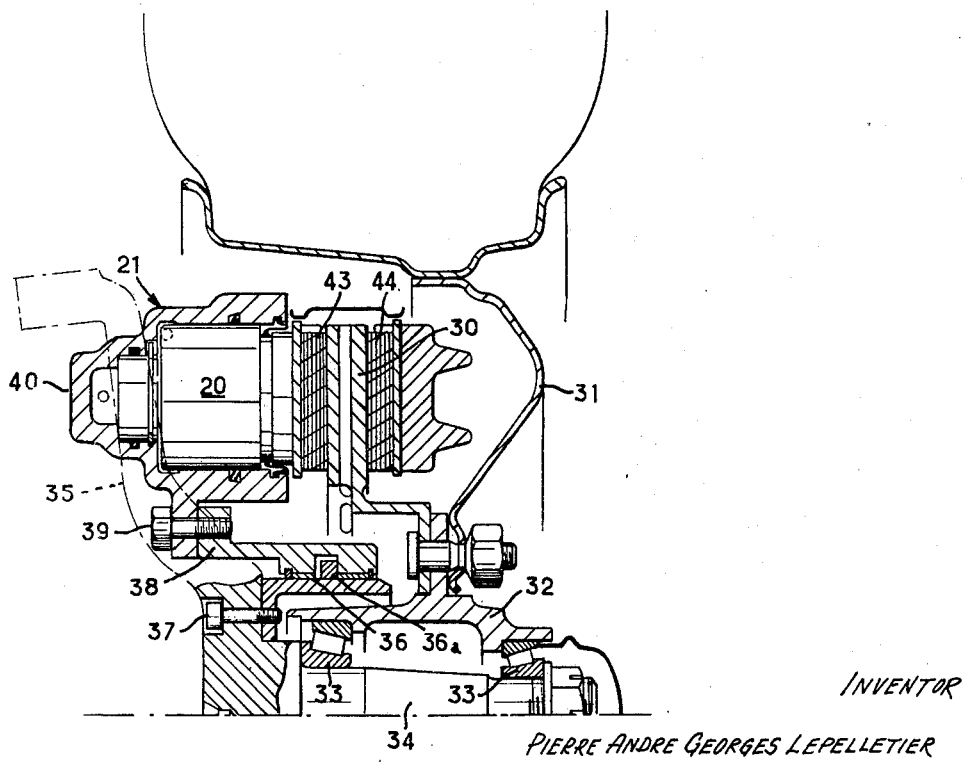
FIG. 2 is a partial view to a larger scale, of a brake in cross-section taken along the line II—II of FIG. 3.
Figure 4:
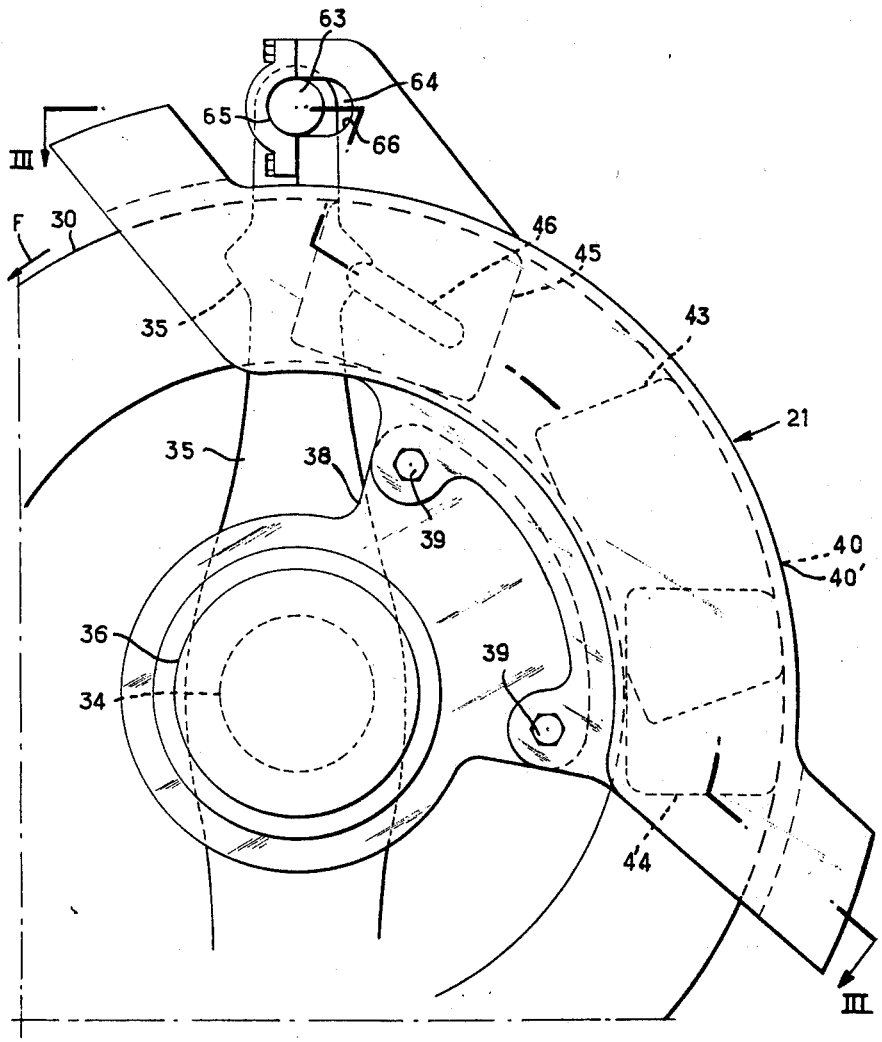
FIG. 4 is a view of the brake taken along the lines IV—IV of FIG. 3.

In the arrangements shown in FIGS. 2, 5 and 6, the central bearing 36 is located on the same side with respect to the part 35. In the alternative form shown in FIG. 7, the central bearing 36 is provided in two opposite parts 100 and 101, the part 100 having an arrangement similar to that of the bearing 36, while the other part 101 is arranged on an extension 102 formed or added to the part 35, and assists in the guiding action. It will be observed that in the non-limitative example shown in FIG. 7, the parts 100 and 101 have different diameters and different lengths of bearing surfaces.

The invention is not restricted to the forms of construction described and shown but includes all alternative forms. For example, and in a non-limitative sense, the disc brake may be installed either inside a wheel as described and shown, or alongside a wheel, or on the output side of the gear-box, or again in any other appropriate position. The assembly 42, 48, 49 can be applied whenever, in any kind of disc brake, a piston co-operates with a double circuit. The arrangement shown in FIG. 5 may be combined with that shown in FIG. 7. The master-cylinder 10 may be provided with additional means, such as an auxiliary station, so as to send a larger quantity of oil to the rear brakes, etc.

What I claim is:

1. In a double-circuit disc brake comprising a rotating disc, a stirrup member rotatably mounted on at least one bearing coaxial with the axis of said disc and adapted to be displaced parallel to said axis on said bearing, the stirrup having a small angular amplitude, a piston slidably mounted in said stirrup parallel to the axis of said disc and acting on the disc through the intermediary of a first lining means, a second lining means interposed between said disc and the side of said stirrup opposite to said piston, and at least one fluid cushion being housed in said stirrup and interposed between a fixed point and said stirrup which receives the circumferential force developed by friction at the moment of braking; the improvement in which said fluid cushion comprises a differential piston having a head and a tail and two bearing surfaces having different diameters between said head and said tail and respectively engaged in two bores in said stirrup so as to define two chambers one of which communicates with the bearing surface of lesser diameter and the other of which communicates with said head of said differential piston, said one chamber having substantially less cross-sectional area than said other chamber, said first-mentioned piston being hollow in the form of a socket and being engaged in a third bore formed in said stirrup, a separate sleeve axially engaged both in said piston and in said third bore, means releasably interconnecting said sleeve and said stirrup, a first hydraulic chamber coupled to one of said circuits and having an annular working section comprised between said third bore and the external section of said sleeve, a second hydraulic chamber coupled to the other circuit and having a full working section defined by the external section of said sleeve, said one chamber communicating with said first chamber to apply primary pressure to said brake, said other chamber communicating with said second chamber to apply secondary pressure to said brake, and means acting between said tail of said differential piston and said fixed point to transmit to said fixed point circumferential force developed by friction at the moment of braking.

2. A double-circuit disc brake as claimed in claim 1, said releasably interconnecting means comprising a circlip.

References Cited

UNITED STATES PATENTS

| 3,137,370 | 6/1964  | Lepelletier | 188—152 |
| 3,173,517 | 3/1965  | Powlas      | 188—152 |
| 3,277,982 | 10/1966 | Kimberlin   | 188—152 |
| 3,292,739 | 12/1966 | Ulbing      | 188—72  |
| 3,322,236 | 5/1967  | Burnett     | 188—73  |

FOREIGN PATENTS

| 1,444,788 | 5/1966 | France. |
| 1,447,007 | 6/1966 | France. |
| 951,602   | 3/1964 | Great Britain. |

GEORGE E. A. HALVOSA, Primary Examiner

U.S. Cl. X.R.

92—108